July 25, 1950 J. L. RENNICK 2,516,255

MAGNETIC VOLUME CONTROL

Filed June 7, 1949

JOHN L. RENNICK
*INVENTOR.*

BY [signature]

HIS AGENT

Patented July 25, 1950

2,516,255

UNITED STATES PATENT OFFICE 2,516,255

MAGNETIC VOLUME CONTROL

John L. Rennick, Elmwood Park, Ill., assignor to Zenith Radio Corporation, a corporation of Illinois Application June 7, 1949, Serial No. 97,601

5 Claims. (Cl. 178—44)

This invention relates to magnetic volume control arrangements which may be used, for example, in radio transmitting or receiving apparatus.

Customary volume control arrangements used in conventional radio apparatus comprise a potentiometer located in the input circuit or the output circuit of an amplifier stage. One of the difficulties encountered with such an arrangement is that of spurious noise generated by the moving contact and conjointly reproduced along with the desired signal. Furthermore, sliding contact arrangements are subject to defective operation as a result of the accumulation of dirt, dust, or other extraneous matter.

In order to provide a volume control without the use of sliding contacts, thereby to overcome these defects, it has been proposed to employ a magnetic field which is controllable as to magnitude and/or direction to control the amount of electron space current flowing to the output electrode of an amplifier tube. Arrangements of this type which have been proposed heretofore are characterized by a limited control range; that is, the voltage in the output circuit cannot be controlled throughout a sufficiently wide amplitude range to satisfy the requirements of some applications.

It is an important object of the present invention, therefore, to provide a magnetic volume control arrangement which affords a greater control range than that obtainable by the use of previously suggested arrangements of this type.

It is also desirable, particularly in audio amplifiers of radio receivers, to provide a certain amount of low frequency emphasis or bass boost, since the response characteristics of audio amplifiers may otherwise tend to fall off at low frequencies. One well-known method for obtaining the desired bass boost is to employ a low frequency emphasis circuit tapped from a conventional volume control potentiometer. Arrangements of this type, however, may not provide sufficient low frequency emphasis at low volume levels.

Accordingly, it is a further object of the present invention to provide a magnetic volume control arrangement which affords, in addition to an increased control range over that of a conventional magnetic volume control, a low frequency emphasis or bass boost which increases continuously with decreasing volume level.

In accordance with the invention, a magnetic volume control comprises an electron discharge device having a cathode, an input electrode, and a pair of anodes. An input circuit is coupled to the input electrode and to the cathode, and an output circuit is coupled to one of the anodes and to the cathode. In order to control the voltage in the output circuit over a predetermined control range, there is provided means external to the device for producing within the device a variable magnetic field for determining the electron space current distribution between the anodes. A load circuit is coupled to the other anode and to the cathode, and a degenerative feedback circuit is coupled from the load circuit to the input circuit to increase the control range.

The features of the present invention which are believed to be novel are set forth with particularity in the appended claims. The invention, together with further objects and advantages thereof, may best be understood, however, by reference to the following description taken in connection with the accompanying drawing, in the several figures of which like reference numerals indicate like elements, and in which:

Figure 1:
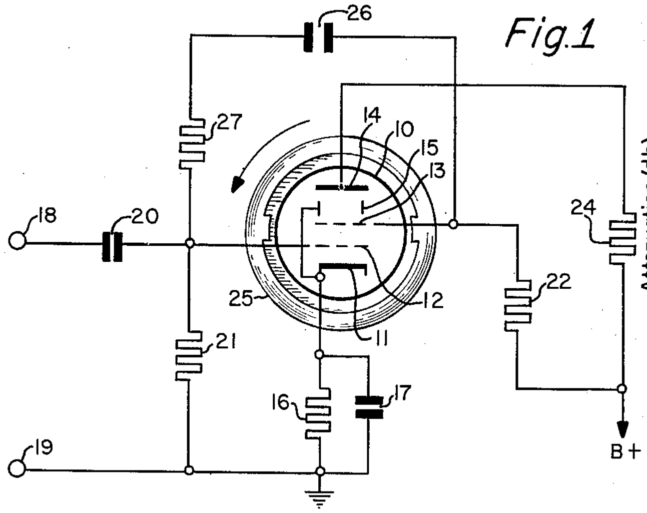
Figure 1 is a schematic circuit diagram of a magnetic volume control constructed in accordance with the present invention.

The magnetic volume control of Figure 1 comprises an electron discharge device 10 having a cathode 11, an input electrode 12 and a pair of anodes 13 and 14. In the illustrated embodiment, electron discharge device 10 is of a type similar to that designated 6AG5, in which anode 13 is formed as a screen grid. Beam forming plates 15, connected to cathode 11, are also provided. Cathode 11 is connected to ground through a self-biasing network provided by the parallel combination of a cathode resistor 16 and bypass condenser 17.

An input circuit coupled to input electrode 12 and to cathode 11 through resistor 16 comprises a pair of input terminals 18 and 19 which may be connected, for example, to the output circuit of the second detector of a superheterodyne radio receiver (not shown). Input terminal 18 is coupled to input electrode 12 through a coupling condenser 20, and input electrode 12 is connected to ground through a grid resistor 21. Input terminal 19 is directly connected to ground. First anode or screen grid 13 is connected to a suitable source of positive unidirectional operating potential, conventionally designated B+, through a load circuit comprising a resistor 22. The other anode 14 is connected to the source B+ through an output resistor 24.

In accordance with the present invention, a permanent magnet 25 is rotatably mounted around the envelope of electron discharge device 10, so that rotation of magnet 25 varies the intensity of the magnetic field component transverse to the electron stream within device 10. A degenerative feedback circuit, comprising a blocking condenser 26 and a coupling resistor 27, is coupled from load resistor 22 to input electrode 12 of device 10. Rotation of magnet 25 varies the voltage in output resistor 24 to provide volume control over a predetermined control range, and the degenerative feedback through blocking condenser 26 and coupling resistor 27 operates to increase this control range.

In operation, device 10 and its associated circuits operate as an audio-frequency amplifier. In the absence of magnet 25 and the degenerative feedback circuit, audio-frequency input signals applied between terminals 18 and 19 are amplified in conventional fashion, the amplified voltage output appearing across output resistor 24 due to current flow in the circuit of anode 14. This amplified output may be coupled to a second stage of audio-frequency amplification (not shown) or may be utilized in any other desired manner.

In the position shown, with magnet 25 disposed to direct the entire magnetic field in a direction transverse to the electron stream, it has been found that magnet 25 operates to divert much the greater portion of the electron space current from output anode 14 to first anode or screen grid 13; hence, in this condition, the voltage appearing across output resistor 24 is greatly attenuated due to the decrease of current in the circuit of anode 14. As magnet 25 is rotated, for example in the direction shown by the arrow, the intensity of the magnetic field component transverse to the electron stream within device 10 is decreased, and as a result, the electron space current distribution between anodes 13 and 14 is varied so that the portion of the space current reaching output anode 14 increases and the portion of the electron space current reaching the other anode 13 decreases. As magnet 25 is rotated through 90°, the transverse component of the magnetic field intensity is continuously decreased. Consequently, rotation of magnet 25 provides a continuous control of the output voltage over a predetermined control range.

By providing degenerative feedback from load resistor 22 to the input circuit of device 10, it has been found that the range throughout which the output voltage may be controlled is materially increased. This observed increase in the output voltage control range is attributed to the fact that the voltages appearing in load resistor 22 and in output resistor 24 are complementary; that is, as the voltage across output resistor 24 increases, the voltage across load resistor 22 decreases due to the variation in the electron space current distribution between output anode 14 and the other anode 13. Thus, when magnet 25 is oriented in the position shown and the output voltage across load resistor 22 is high, and since the feedback from load resistor 22 to the input circuit is degenerative, this feedback operates to reduce the output voltage level still further. Similarly, when magnet 25 has been rotated in the direction shown through an angle of 90°, the output voltage is at a maximum level and the voltage across load resistor 22 is at a minimum; thus, in this condition, the degenerative feedback is very small and has little effect. The net result is that the degenerative feedback circuit from load resistor 22 to the input circuit cooperates with the rotatable magnet structure to provide a material increase in the control range of the output voltage over that obtainable with prior magnetic volume control arrangements.

Figure 2:
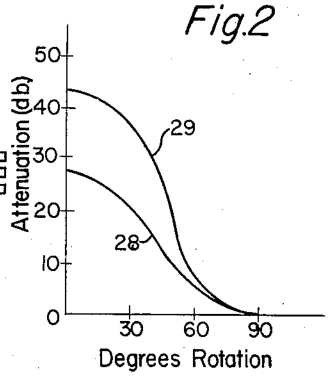
Figure 2 is a graphical representation of a control characteristic of the volume control of Figure 1.

Figure 2 is a graphical representation of a control characteristic of the arrangement of Figure 1. In Figure 2, decibel attenuation is plotted as a function of the angular position of magnet 25 with respect to the electron stream. Curve 28 represents the control characteristic for a magnetic volume control similar to that shown in Figure 1 but without degenerative feedback to the input circuit. From curve 28, it is observed that the overall control range from 0° to 90° rotation of the magnet is about 28 decibels. Curve 29 represents the control characteristic obtained when degenerative feedback from the auxiliary anode to the input circuit is employed in combination with the movable magnet. It is observed that this combination affords a control range of about 43 decibels, representing a material increase over the control range obtainable without degenerative feedback.

For magnet positions from 90° to 180°, the control characteristics are substantially symmetrical about the 90° abscissa with respect to curves 28 and 29.

Figure 3:
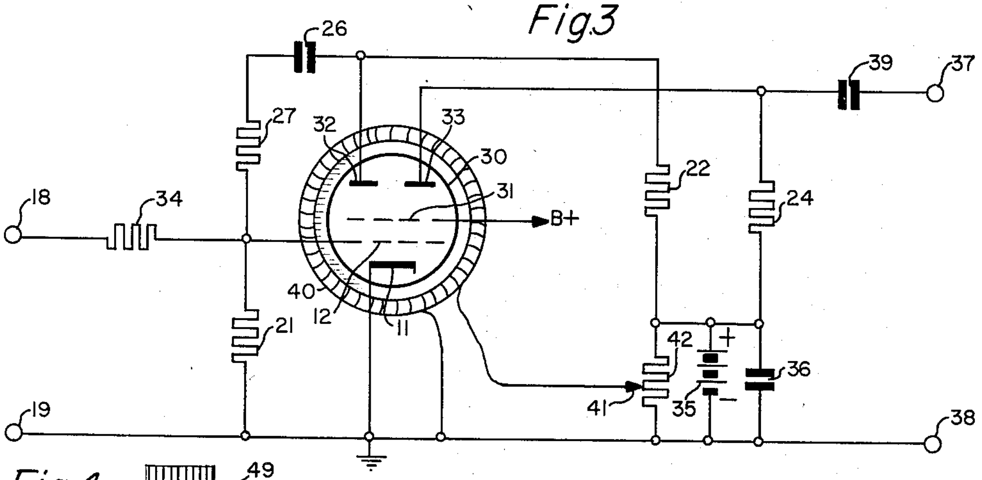
Figure 3 is a schematic circuit diagram of another embodiment of the invention.

Figure 3 is a schematic representation of another embodiment of the invention utilizing a somewhat different type of electron discharge device. The electron discharge device 30 comprises a cathode 11, an input electrode 12, a screen grid 31, and a pair of anodes 32 and 33. Cathode 11 is directly connected to ground, and screen grid 31 is connected to source B+. Input terminal 18 is coupled to input electrode 12 through a coupling resistor 34. Anodes 32 and 33 are coupled to the positive terminal of a suitable source of positive unidirectional operating potential, here shown as a battery 35 bypassed to ground by means of a condenser 36, through load resistor 22 and output resistor 24 respectively. A pair of output terminals 37 and 38 are provided, terminal 37 being coupled to output anode 33 by means of a coupling condenser 39, and terminal 38 being directly connected to ground.

Instead of a permanent magnet, the system of Figure 3 utilizes an electromagnet 40 such as a solenoid coaxially disposed about device 30. One terminal of solenoid 40 is directly grounded, and the other is connected to a variable tap 41 on a potentiometer 42 which is connected across battery 35.

The degenerative feedback circuit from load resistor 22 to the input circuit comprises blocking condenser 26 and series resistor 27. The time constant of the feedback circuit comprising condenser 26 and resistor 27 is selected to give a desired low frequency emphasis characteristic; for example, a time constant of .01 second affords effective emphasis for frequencies up to 100 cycles per second. It is contemplated that other types of tone control circuits may be employed in the degenerative feedback circuit for controlling the frequency and/or amplitude response of the system.

In the system of Figure 3, anodes 32 and 33 of device 30 are disposed adjacent each other in a common plane, and the magnetic field is directed vertically with respect to the plane of the drawing. With this arrangement, it is perhaps easier to understand how the magnetic field variations result in changes in the electron space current distribution between the anodes. When variable tap 41 on potentiometer 42 is moved to the ground terminal, no magnetic field is produced within the device 30. Device 30 is constructed so that in this condition the entire electron space current flows to output anode 33. When tap 41 is moved to the opposite terminal of potentiometer 42, a maximum magnetic field is reproduced within the tube, and this field is directed perpendicularly with respect to the plane of the drawing and transverse to the electron stream. The effect of this vertical magnetic field is to deflect the electrons in a direction perpendicular both to the electron stream and to the direction of the magnetic field; the maximum magnetic field intensity is made sufficiently great that the entire electron space current is diverted from output anode 33 to the auxiliary anode 32. Thus, the voltage appearing in output resistor 24 may be controlled from a maximum when tap 41 is at ground potential to a minimum when tap 41 is connected to the high potential terminal of potentiometer 42, and the voltage in load resistor 22 varies in a manner complementary to the output voltage variations.

The degenerative feedback from load resistor 22 to the input circuit results in a material increase in the output voltage control range as explained in connection with Figure 1. Moreover, the provision of condenser 26 and resistor 27 results additionally in the provision of a substantial effective bass boost or low-frequency emphasis. Furthermore, since the bass boost circuit is connected in the degenerative feedback loop from the auxiliary anode to the input circuit, the amount of effective low frequency emphasis increases continuously with decreasing output volume level. Other types of frequency selective networks may be employed in the feedback circuit to provide any desired frequency and/or amplitude response; with any such arrangement, the amount of tone control action increases continuously with decreasing output volume level.

As an alternative arrangement, instead of varying the axial magnetic field intensity within device 30 by changing the position of tap 41 on potentiometer 42, the desired field intensity variation may be provided by arranging solenoid 40 to be movable axially with respect to device 30 and by exciting solenoid 40 from a constant potential source.

Figure 4:
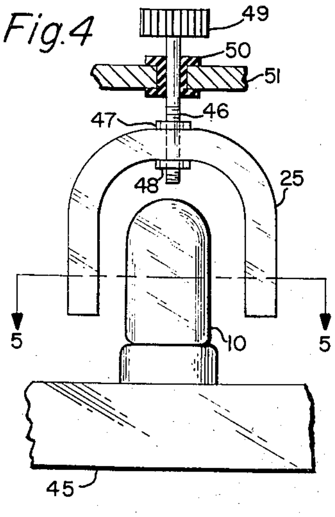
Figure 4 is a side view, partly in section, of a portion of a physical embodiment of the invention.

There is shown in Figure 4 a fragmentary view partly in section of a portion of a radio receiver embodying a magnetic volume control such as that described in connection with Figure 1.

Electron discharge device 10 is mounted on a chassis 45, and suitable circuit connections (not shown) are provided to connect device 10 in a circuit similar to that of Figure 1. Permanent magnet 25, which may be of the horseshoe type, is secured to a shaft 46 as by means of a pair of nuts 47 and 48. Shaft 46 bears a control knob 49 and is rotatable in a bushing 50 extending through the wall 51 ofa radio cabinet. In this manner, magnet 25 may be rotated with respect to device 10, thereby to vary the intensity of the magnetic field component transverse to the electron stream within the tube.

Figure 5:
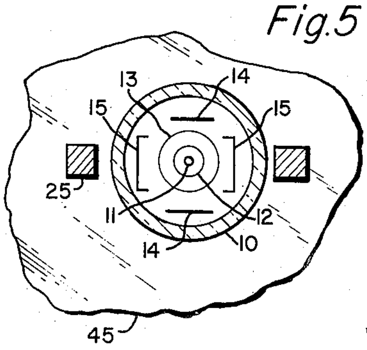
Figure 5 is a sectional view taken along the line 5—5 of Figure 4.

Figure 5 is a transverse section taken along the lines 5—5 of Figure 4 and includes a representation of the internal electrode arrangement of device 10. When the magnet 25 in the position illustrated is parallel to the plane of anode 14, the magnetic field intensity component transverse to the electron stream is at a maximum, and the volume of the output circuit is at a minimum.

Merely by way of illustration, and in no sense by way of limitation, it has been found that the following circuit component values may be employed in the circuit of Figure 1 to provide a control characteristic such as that illustrated as curve 29 in Figure 2:

Electron discharge device 10, type 6AG5
Resistor 21, 10 megohms
Resistor 22, 1,000 ohms
Resistor 24, 10,000 ohms
Condenser 26, 0.1 microfarad
Resistor 27, 0.1 megohm
Magnet 25, a ring type permanent magnet rotatably mounted with respect to device 10 to provide a magnetic field directed transversely of the electron stream.

Since the present invention is directed to the combination of a particular type of degenerative feedback circuit with a magnetic volume control device, the particular structure of the electron discharge device and the manner in which the magnetic field is applied are not to be limited to the illustrated embodiments. Any magnetic volume control device may be utilized so long as variation in the intensity and/or direction of the magnetic field results in a continuous change in the electron space current distribution between two anodes. In accordance with the invention, one of the anodes is utilized as an output electrode, and a degenerative feedback circuit is connected between the other anode and the input circuit of the electron discharge device.

Thus, the present invention provides an improved magnetic volume control circuit having a control range materially greater than prior magnetic volume control arrangements. As an additional feature, by providing one or more frequency selective networks in the feedback circuit, tone control action which increases continuously in effectiveness with decreasing output voltage level may be provided. The arrangement may find advantageous application in the radio-frequency and intermediate-frequency stages of a radio receiver as well as in the audio-frequency stages.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. A magnetic volume control system comprising, in combination: an electron discharge device having a cathode, an input electrode, and a pair of anodes; an input circuit coupled to said input electrode and to said cathode; an output circuit coupled to one of said anodes and to said cathode; means external to said device for producing a variable magnetic field within said device for determining the electron space current distribution between said anodes in accordance with said field thereby to control the voltage in said output circuit over a predetermined control range; a load circuit coupled to the other of said anodes and to said cathode; and a degenerative feedback circuit coupled from said load circuit to said input circuit to increase said control range.

2. A magnetic volume control system comprising, in combination: an electron discharge device having a cathode, an input electrode, and a pair of anodes; an input circuit coupled to said input electrode and to said cathode; an output circuit coupled to one of said anodes and to said cathode; means external to said device for producing a variable magnetic field within said device for determining the electron space current distribution between said anodes in accordance with said field, thereby to control the voltage in said output circuit over a predetermined control range; a load circuit coupled to the other of said anodes and to said cathode; and a degenerative feedback circuit coupled from said load circuit to said input circuit to increase said control range and including a frequency selective network to provide a tone control of increasing effectiveness as said output voltage decreases.

3. A magnetic volume control system comprising, in combination: an electron discharge device having a cathode, an input electrode, and a pair of anodes; an input circuit coupled to said input electrode and to said cathode; an output circuit coupled to one of said anodes and to said cathode; a permanent magnet external to said device for producing a magnetic field within said device and movable relative thereto to vary said field for determining the electron space current distribution between said anodes in accordance with said field, thereby to control the voltage in said output circuit over a predetermined control range; a load circuit coupled to the other of said anodes and to said cathode; and a degenerative feedback circuit coupled from said load circuit to said input circuit to increase said control range.

4. A magnetic volume control system comprising, in combination: an electron discharge device having a cathode, an input electrode, and a pair of anodes; an input circuit coupled to said input electrode and to said cathode; an output circuit coupled to one of said anodes and to said cathode; electromagnetic means external to said device for producing a variable magnetic field within said device for determining the electron space current distribution between said anodes in accordance with said field, thereby to control the voltage in said output circuit over a predetermined control range; a load circuit coupled to the other of said anodes and to said cathode; and a degenerative feedback circuit coupled from said load circuit to said input circuit to increase said control range.

5. A magnetic volume control system comprising, in combination: an electron discharge device having in the order named a cathode, an input grid, a screen grid, and an anode; an input circuit coupled to said input grid and to said cathode; an output circuit coupled to said anode and to said cathode; means external to said device for producing a variable magnetic field within said device for determining the electron space current distribution between said anode and said screen grid in accordance with said field, thereby to control the voltage in said output circuit over a predetermined control range; a load circuit coupled to said screen grid and to said cathode; and a degenerative feedback circuit coupled from said load circuit to said input circuit to increase said control range.

JOHN L. RENNICK.

REFERENCES CITED

The following references are of record in the file of this patent:

UNITED STATES PATENTS

| Number | Name | Date |
|---|---|---|
| 2,221,744 | Henry | Nov. 12, 1940 |
| 2,225,689 | Demuth | Dec. 24, 1940 |